United States Patent
Gleacher et al.

(10) Patent No.: US 7,526,382 B2
(45) Date of Patent: Apr. 28, 2009

(54) SIDE COLLISION PLAUSIBILITY WITH LATERAL VELOCITY

(75) Inventors: Jeffrey D. Gleacher, West Bloomfield, MI (US); Thomas J. Malbouef, Jr., Grosse Pointe, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 472 days.

(21) Appl. No.: 11/353,342

(22) Filed: Feb. 14, 2006

(65) Prior Publication Data

US 2006/0190176 A1 Aug. 24, 2006

Related U.S. Application Data

(60) Provisional application No. 60/654,616, filed on Feb. 18, 2005.

(51) Int. Cl.
*G08G 1/16* (2006.01)
(52) U.S. Cl. .......................... 701/301; 701/45
(58) Field of Classification Search ......... 701/300–302, 701/45; 340/436, 438, 425.5; 180/167
See application file for complete search history.

(56) References Cited

U.S. PATENT DOCUMENTS 6,654,674 B2 * 11/2003 Lu et al. ................. 701/36
7,245,998 B2 * 7/2007 Ogata et al. ............ 701/45
2005/0000748 A1 1/2005 Link et al.

FOREIGN PATENT DOCUMENTS

| DE | 19729960 | 11/1998 |
|---|---|---|
| DE | 10020084 | 11/2001 |
| DE | 10155662 | 5/2003 |
| DE | 10303149 | 7/2004 |
| DE | 10317640 | 11/2004 |
| WO | 03/081180 | 10/2003 |
| WO | 2005/123462 | 12/2005 |
| WO | 2006/005453 | 1/2006 |

OTHER PUBLICATIONS

International Search Report / Written Opinion dated Jun. 8, 2006.

* cited by examiner

*Primary Examiner*—Yonel Beaulieu

(57) ABSTRACT

The method and system of this invention discriminates between a lateral collision and a static non-collision event by measuring lateral velocity of the vehicle and adjusting a threshold value causing occupant restraint system actuation according to the measured lateral velocity. The threshold value is decreased in response to an increase in lateral velocity and increased or maintained at a higher value when lateral velocity is minimal to prevent actuation caused by a non-crash event such as a door slam.

14 Claims, 4 Drawing Sheets

SIDE COLLISION PLAUSIBILITY WITH LATERAL VELOCITY

CROSS REFERENCE TO RELATED APPLICATION

The application claims priority to U.S. Provisional Application No. 60/654,616 which was filed on Feb. 18, 2005.

BACKGROUND OF THE INVENTION

This invention generally relates to a method and system for sensing a side collision. More particularly, this invention relates to a system and method for adjusting an acceleration threshold value responsive to a measured vehicle lateral velocity.

Vehicles including active occupant restraint systems such as air bags include a plurality of sensors disposed throughout the vehicle to detect a crash or collision condition requiring actuation of specific restraint systems. The occupant restraint system verifies measurements from one sensor through measurements from another sensor to protect against undesired actuation caused by sensor failure. However, a lateral collision, for example, a side impact with a pole, is a very local event, the immediate effects of which are measurable over a limited area of the vehicle. Therefore, sensors disposed in areas distant from the impact area may not indicate collision conditions to the magnitude required to verify the sensor reading in the area of impact to cause activation of the occupant restraint system.

One current method of countering such performance is to decrease the threshold value required to cause actuation of the occupant restraint system. Unfortunately, the threshold value may be required to be lowered to such a level so as to cause actuation of the occupant restraint system for static abuse conditions, such as for example, rocking of a vehicle, slamming a door, or an impact by a shopping cart.

Disadvantageously, once the occupant restraint system is actuated, (e.g. the air bags are explosively inflated) they must be replaced and repaired at a significant cost.

Accordingly, it is desirable to develop a method and system that discerns between a true lateral collision and a static abuse situation to prevent undesired actuation of an occupant restraint system.

SUMMARY OF THE INVENTION

The method and system of this invention discriminates between a lateral collision and a static non-collision event. The method measures lateral velocity of the vehicle and adjusts a threshold value causing occupant restraint system actuation to discern between a lateral collision and a static non-collision condition.

The system operates by determining a lateral velocity through the use of a lateral velocity sensor and adjusting the threshold value required to actuate the occupant restraint system. The acceleration threshold value is decreased in response to an increase in lateral velocity. A lateral velocity indicates vehicle movement and therefore any acceleration value indicative of a collision is not caused by a non-crash event such a door slam. Accordingly, the system will actuate the occupant restraint devices, such as air bags.

For lower or zero lateral velocity values, the acceleration threshold value remains high to prevent undesired actuation from a non-crash event such as a door slam.

Accordingly, the example system and method of this invention discriminates between a static condition not requiring occupant restraint system actuation and a collision event requiring actuation.

These and other features of the present invention can be best understood from the following specification and drawings, the following of which is a brief description.

DETAILED DESCRIPTION OF THE PREFERRED EMBODIMENT

Figure 1:
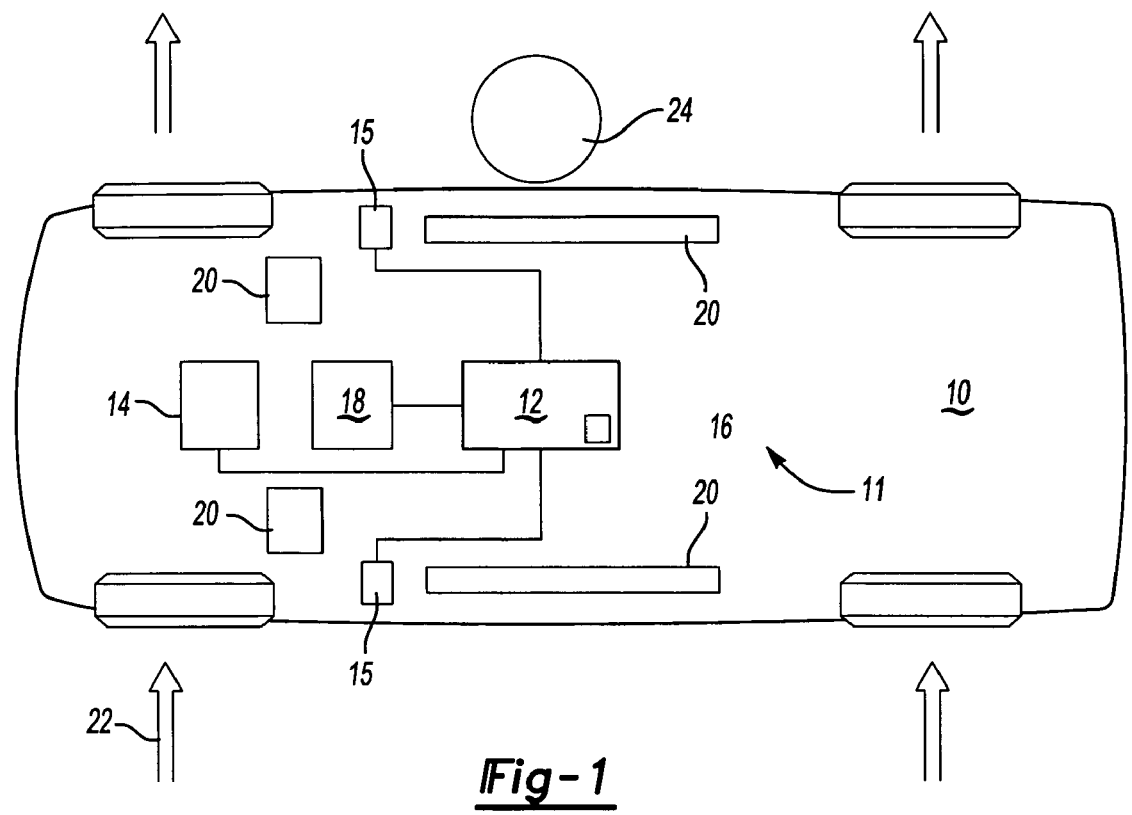
FIG. 1 is schematic view of a vehicle including an example system according to this invention.

Referring to FIG. 1, a vehicle 10 includes an occupant restraint system 11 with an electronic control unit (ECU) 12 that receives information from a lateral sensor 14 that is utilized to determine and adjust a safing threshold. The safing threshold is an acceleration value that is detected by an acceleration sensor 16. The example method and system 11 adjusts the acceleration threshold value required to initiate actuation of the occupant restraint system 11. The example occupant restraint system 11 includes several air bags 20 disposed at different locations within the vehicle 10 that are actuated responsive to the measured acceleration exceeding the desired threshold value.

The example system of this invention verifies that the vehicle 10 is actually involved in a lateral collision with an object such as a pole 24 or another vehicle. The system 11 operates by detecting a crash incident by detecting an acceleration value. The magnitude of acceleration or deceleration is measured and if above a threshold value is utilized as a prompt to initiate actuation of one of the air bags 20. The acceleration value is measured by at least one acceleration sensor 16 within the vehicle. An acceleration sensor 16 is disposed with the ECU 12, and satellite acceleration sensors 15 are disposed in pillars or body structures of the vehicle 10.

As appreciated, a lateral collision is localized to a specific region of the vehicle 10. This means that the satellite acceleration sensor 15 in some parts of the vehicle 10 may not sense the acceleration of the vehicle to the magnitude required to initiate actuation of the air bags 20. Accordingly, verification of an acceleration measurement indicative of a lateral impact may not be possible at remotely located sensors to verify the measurements and initiate actuation of the system 11. However, simply reducing the threshold acceleration value required to cause actuation is not a desirable solution as static non-collision events can be measured with acceleration values sufficient to cause actuation.

Figure 2:
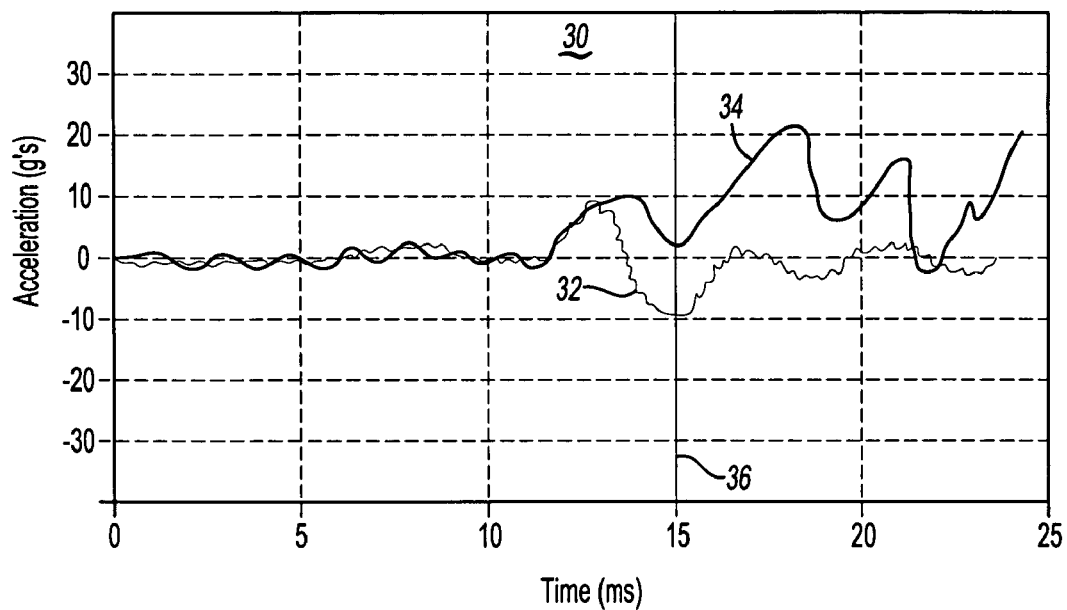
FIG. 2 is a graph illustrating a difference between a door slam and a collision.

Referring to FIG. 2, a graph 30 illustrates an acceleration measurement from an acceleration sensor disposed within the vehicle ECU 12 of the vehicle. Two acceleration measurements are compared. A first acceleration value 32 is shown and measures the acceleration measured in response to the slamming of a car door. As appreciated, other non-crash events such as rocking the car, or a shopping cart hitting the car door could also result in similar acceleration measurements. The second acceleration value 34 is the result of a side impact collision at approximately 18 mph. The two acceleration values 32, 34 are substantially similar from a time of 0 to approximately 13 ms. Further, the second acceleration value 34 does not become significantly greater than the first acceleration value 32 until after 15 ms indicated by line 36. It is commonly desired to actuate an air bag 20 between 0 and 15 ms from impact to provide the desired protection.

As is illustrated by graph 30, a door slam is substantially the same during time period of 0 to 13 ms and therefore simply lowering a threshold value would result in air bag actuation responsive to door slams and non-crash conditions.

Figure 3:
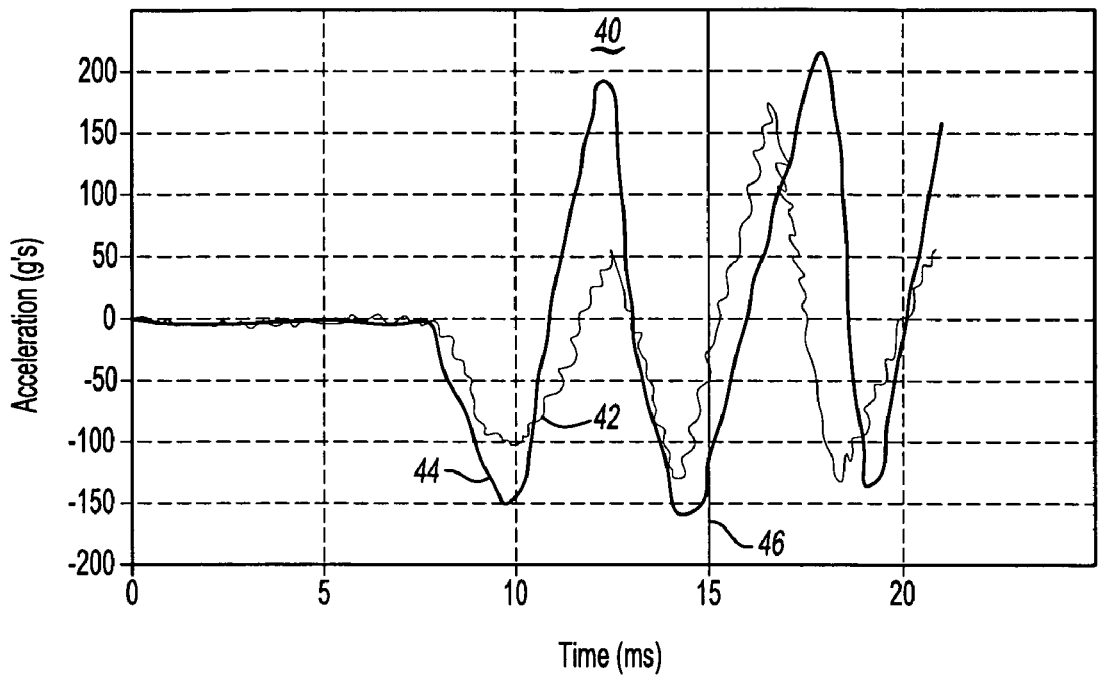
FIG. 3 is another graph illustrating a difference between a door slam and a collision.

Referring to FIG. 3, graph 40 illustrates the acceleration measurements for the satellite acceleration sensor 15 disposed within a pillar of the vehicle 10. In this instance the acceleration value of the door slam is shown at 42 and the acceleration value resulting from an 18 mph collision is shown at 44. Although the difference between the measured acceleration value 42 and 44 is increased, there still is not as large a distinction as desired. Further, the difference between the two signals is not entirely evident until after approximately 13 ms have elapsed. As appreciated, actuation prior to 15 ms indicated by line 46 is desirable.

Figure 4:
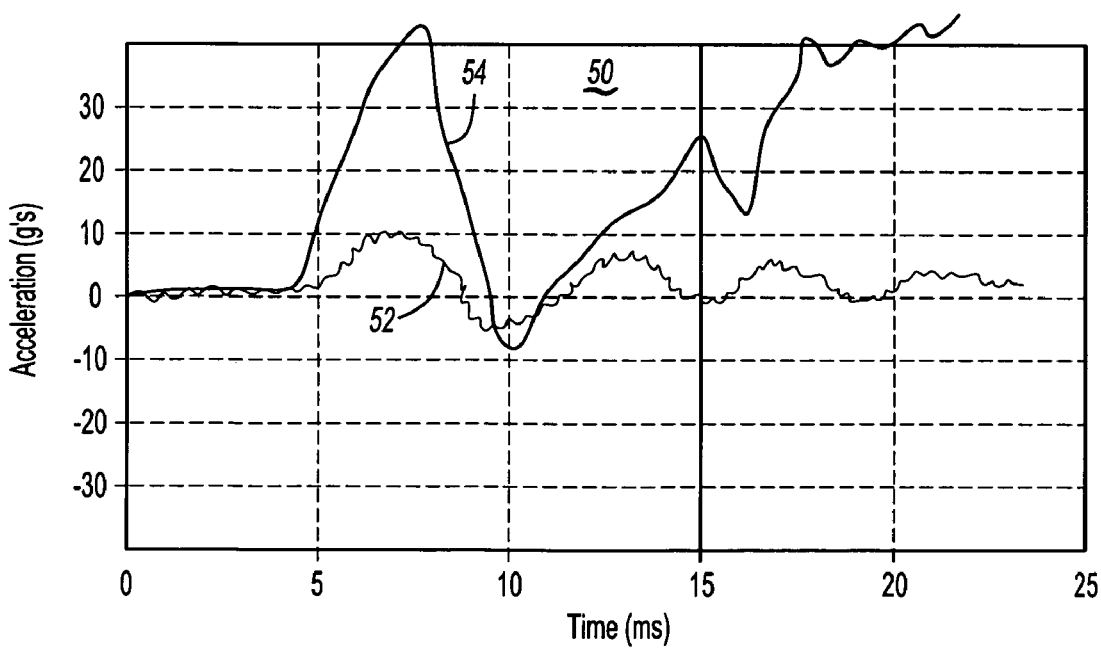
FIG. 4, is another graph illustrating a difference between a door slam and a collision.

Referring to FIG. 4, graph 50 illustrates acceleration measurements for the acceleration sensor 16 for a side impact were the vehicle 10 is hit by another vehicle as is shown by line 54 and for a door slam as is shown at 52. As is shown, the difference between the actual impact 54 and the door slam is significant at a time beginning at approximately 5 ms. Accordingly, a higher acceleration value is reached within a desired time to discriminate between a static non-collision event and a collision event. Therefore, higher safing threshold values provide the desired acceleration values require to cause actuation.

The system 11 operates by determining a lateral velocity through the use of a lateral velocity sensor 14 and adjusting the threshold value required to actuate the air bags 20 or other occupant restraints as are known. The lateral velocity can be obtained by the lateral velocity sensor 14, or can be obtained from other systems within the vehicle 10. For example, a vehicle equipped with an electronically controlled suspension system may include a lateral velocity sensor for determining suspension adjustment. The lateral velocity measurement is utilized to adjust the threshold acceleration value required to allow actuation of the air bags 20.

Figure 5:
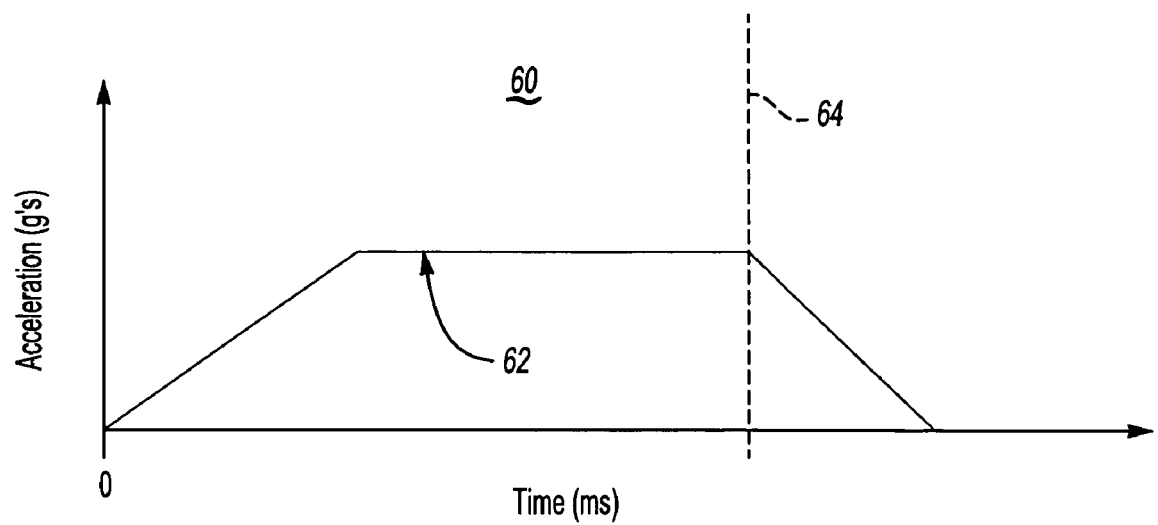
FIG. 5 is a schematic representation illustrating acceleration during a collision test.

Referring to FIG. 5, the acceleration of a vehicle is illustrated for a lateral collision test. The line 62 illustrates acceleration during a collision test. The vehicle 10 first is accelerated to a desired velocity. A constant velocity is indicated by the flat line. The period of constant velocity is followed by a period of rapid deceleration after hitting the fixed object. The point of contact with the fixed object is illustrated by the line 64. Because testing utilizes a machine to simulate lateral movement of the vehicle, the speedometer does not register any velocity. Accordingly, a separate means of measuring lateral velocity, such as a separate sensor 14 or information from another system is utilized.

Figure 6:
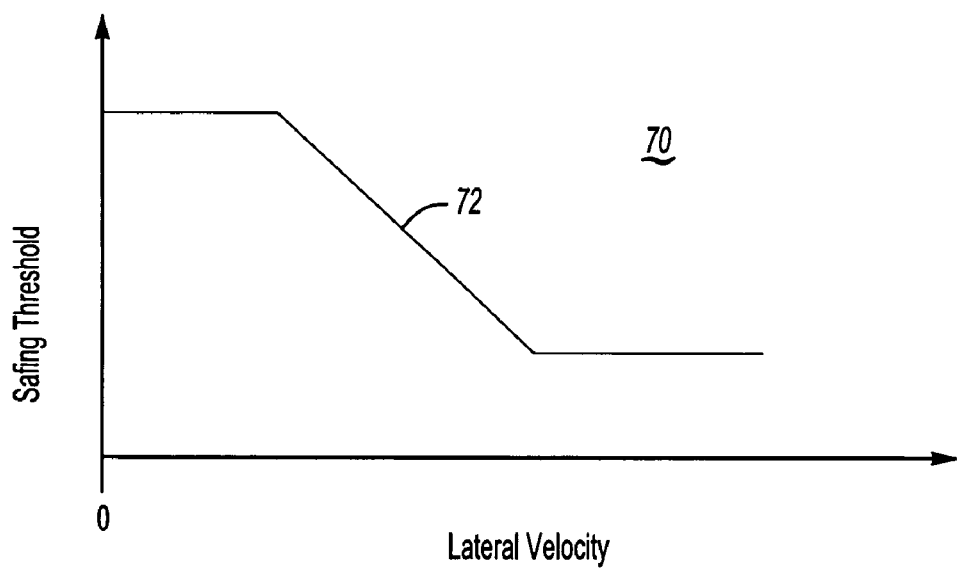
FIG. 6 is a schematic representation of an example relationship between lateral velocity and a safing threshold

Referring to FIG. 6, graph 70 schematically illustrates the safing threshold as it relates to lateral velocity. The line 72 illustrates how the safing threshold decreases in response to an increase in lateral velocity. The safing threshold is the measured acceleration value required to verify acceleration measurements obtained by satellite acceleration sensors.

Figure 7:
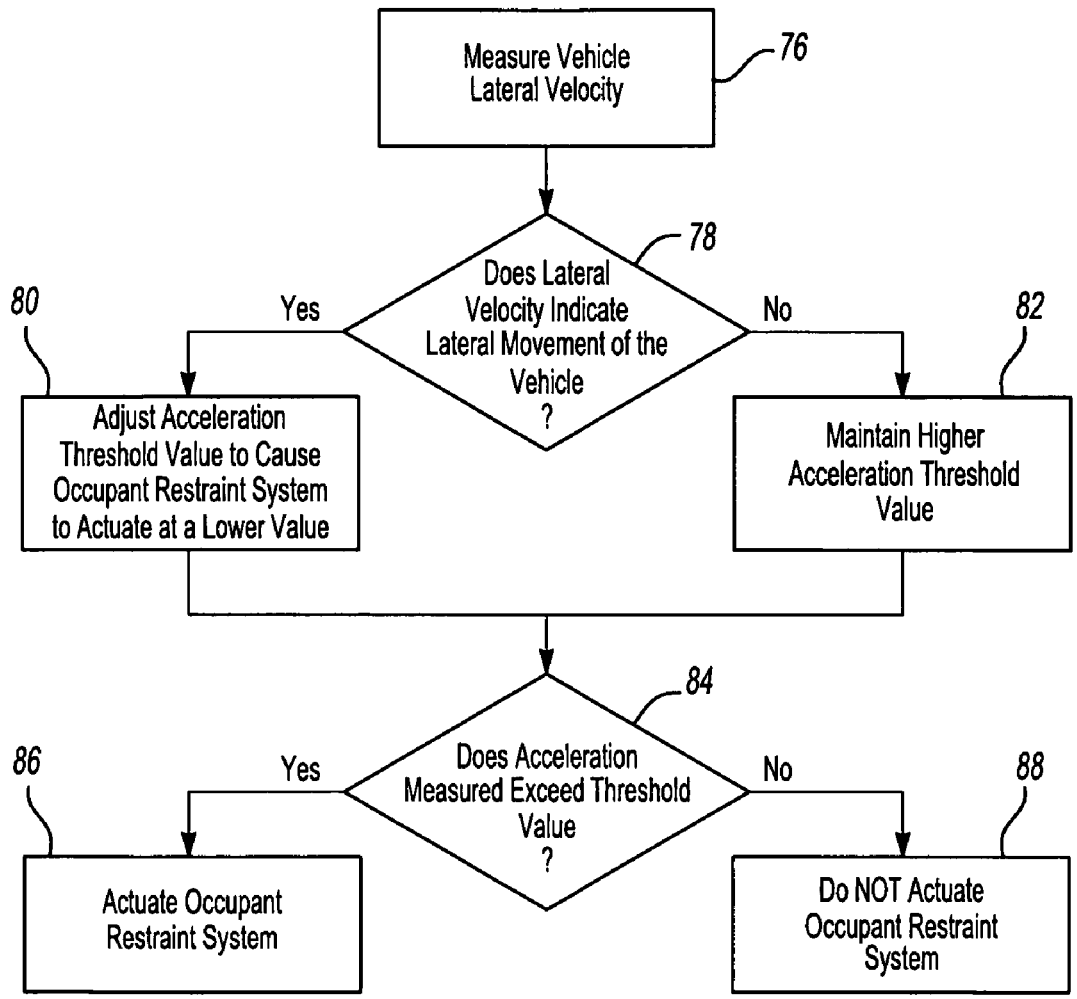
FIG. 7 is a block diagram of example method steps according to this invention.

Referring to FIG. 7, operation of the system 11 begins by sensing a lateral velocity of the vehicle 10 as indicated at 76. Lateral velocity is measured constantly by the lateral velocity sensor 14. The example lateral velocity sensor 14 is a low-offset lateral sensor, although other known sensors for measuring velocity are within the contemplation of this invention. Further, the lateral velocity sensor 14 can be part of another system such as a yaw sensor for an active suspension system.

The lateral velocity sensor 14 provides a value indicative of lateral movement of the vehicle 10 to the ECU 12. The ECU 12 adjusts a threshold acceleration value, as indicated at 80 that will cause actuation of the occupant restraint system 11 (FIG. 6). If minimal or no lateral velocity is measured, the acceleration value required to cause actuation of the occupant restraint system 11 remains at a high value as indicated at 82.

When lateral velocity increases, the threshold value of the acceleration required to cause actuation is lowered. The illustrated example proportionally reduces the acceleration threshold value according to the increase in lateral velocity. The acceleration threshold value may also be adjusted to a signal lower value responsive to lateral velocity increasing above a desired limit.

Independent of the lateral velocity, the acceleration sensors disposed within the vehicle provide information to the ECU 12 indicative of vehicle acceleration as indicated at 84. The ECU 12 adjusts the threshold value according to the lateral velocity. When an acceleration value is detected that exceeds the threshold value at a specific moment, the occupant restraint system 11 is actuated to inflate one of the air bags 20 as indicated at 86. Further if acceleration value is below the acceleration threshold value, the system 11 is not actuated as is indicated at 88.

Accordingly, the system and method discriminates between a static condition not requiring occupant restraint system actuation and a collision event requiring actuation.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of discerning a lateral impact of a vehicle comprising the steps of:
    a) measuring a lateral velocity; and
    b) measuring vehicle acceleration;
    c) maintaining a deployment threshold acceleration value at a higher value responsive to a measured lateral velocity that is not indicative of lateral movement of the vehicle, when the measured vehicle acceleration is indicative of a lateral impact, wherein the higher value is determined to prevent deployment due to static abuse of the vehicle; and
    d) lowering the deployment threshold acceleration value responsive to a measured lateral velocity indicative of lateral movement of the vehicle.

2. The method as recited in claim 1, including actuating an occupant restraint system responsive to a measured value greater than the deployment threshold acceleration value.

3. The method as recited in claim 1, including the step of measuring lateral velocity with a low-offset lateral sensor disposed on the vehicle.

4. The method as recited in claim 2, wherein the deployment threshold acceleration value is determined for a measurement obtained by a sensor separate from the low-offset lateral sensor.

5. A system for verifying plausibility of a sensor measurement comprising:
   a lateral movement sensor for measuring lateral velocity;
   an acceleration sensor for measuring vehicle movement; and
   at least one satellite acceleration sensor measuring a characteristic indicative of a lateral collision, wherein a lateral collision is determined to be plausible responsive to the lateral movement sensor measuring lateral velocity above a threshold value that is indicative of vehicle movement and acceleration is measured by one of the acceleration sensor and the at least one satellite acceleration sensors above a deployment threshold acceleration value, wherein a deployment threshold acceleration value is maintained at a high value responsive to the measured lateral velocity indicating that an measured acceleration value is indicative of static abuse instead of a potential lateral collision.

6. The system as recited in claim 5, wherein a plausibility of a lateral collision is not indicated responsive to a measurement of the lateral movement sensor below the threshold value.

7. The system as recited in claim 5, wherein the characteristic indicative of a lateral collision comprises acceleration.

8. The system as recited in claim 7, wherein the system decreases the deployment threshold acceleration value determined to be indicative of a lateral collision responsive to measured lateral velocity indicating movement of the vehicle.

9. The system as recited in claim 5, wherein the lateral movement sensor is disposed within a controller for actuating an occupant restraint system.

10. The system as recited in claim 5, wherein the lateral movement sensor comprises a part of a suspension control system.

11. The system as recited in claim 5, wherein the at least one satellite acceleration sensors are disposed within an exterior body structure of a vehicle.

12. The system as recited in claim 5, wherein the lateral movement sensor comprises a yaw rate sensor.

13. The method as recited in claim 1, including the step of verifying that the measured vehicle acceleration is indicative of a lateral impact and not a static non-impact event by comparing the measured lateral velocity to a desired threshold.

14. The system as recited in claim 5, where the characteristic indicative of a lateral collision measure by at least one satellite acceleration sensor is verified as not originating from a static non-impact event by comparing the measured lateral velocity to the threshold value indicative of vehicle movement.

* * * * *